United States Patent
Hua et al.

(10) Patent No.: US 8,687,851 B2
(45) Date of Patent: Apr. 1, 2014

(54) GENERIC OBJECT-BASED IMAGE RECOGNITION APPARATUS WITH EXCLUSIVE CLASSIFIER, AND METHOD FOR THE SAME

(75) Inventors: Yang Hua, Singapore (SG); Shuicheng Yan, Singapore (SG); Zhongyang Huang, Singapore (SG); Sheng Mei Shen, Singapore (SG); Ryouichi Kawanishi, Kyoto (JP)

(73) Assignee: Panasonic Corporation, Osaka (JP)

(*) Notice: Subject to any disclaimer, the term of this patent is extended or adjusted under 35 U.S.C. 154(b) by 5 days.

(21) Appl. No.: 13/508,850

(22) PCT Filed: Sep. 9, 2011

(86) PCT No.: PCT/JP2011/005081
§ 371 (c)(1),
(2), (4) Date: May 9, 2012

(87) PCT Pub. No.: WO2012/032788
PCT Pub. Date: Mar. 15, 2012

(65) Prior Publication Data
US 2012/0230546 A1 Sep. 13, 2012

Related U.S. Application Data

(60) Provisional application No. 61/381,608, filed on Sep. 10, 2010.

(51) Int. Cl.
*G06K 9/00* (2006.01)
(52) U.S. Cl.
USPC .......................................... 382/103; 382/181
(58) Field of Classification Search
USPC ....................................................... 382/181
See application file for complete search history.

(56) References Cited

U.S. PATENT DOCUMENTS 8,320,679 B2 * 11/2012 Li et al. .................... 382/209
2010/0232671 A1 * 9/2010 Dam et al. ................ 382/132

FOREIGN PATENT DOCUMENTS

JP 2008-217706 9/2008

OTHER PUBLICATIONS

International Search Report issued Nov. 1, 2011 in International (PCT) Application No. PCT/JP2011/005081.

(Continued)

*Primary Examiner* — Tom Y Lu
(74) *Attorney, Agent, or Firm* — Wenderoth, Lind & Ponack, L.L.P.

(57) ABSTRACT

The present invention provides an image recognition apparatus with enhanced performance and robustness.

In an image recognition apparatus 1, an image classification information accumulating unit 20 stores therein feature information defining visual features of various objects obtained through a learning process. For classification of input images, an image feature obtaining unit 18 extracts descriptors indicating features from each input image, image vocabularies corresponding to the descriptors are voted, and a classifying unit 19 calculates existence probabilities of one or more candidate objects, based on the result of the voting. According to the existence probabilities, objects contained in the image is identified. Through the calculation, the existence probabilities are adjusted by an exclusive classifier, based on exclusive relationship information defining exclusive object sets each containing different objects (object labels) predicted not to coexist in a same image.

8 Claims, 10 Drawing Sheets

(56) References Cited

OTHER PUBLICATIONS

Y. Kondo et al., "Using the Co-occurrence of Multiple Categories for Object Recognition" IEICE Technical Report, vol. 107, No. 539, pp. 363-372, Mar. 3, 2008 (with partial English translation and verification of translation).

H. Liu et al., "Robust Graph Mode Seeking by Graph Shift", Proceedings of the 27th International Conference on Machine Learning, 2010.

A. Torralba, "Contextual Priming for Object Detection", International Journal of Computer Vision, vol. 53, No. 2, 2003, pp. 169-191.

R. Tibshirani, "Regression Shrinkage and Selection via the Lasso", Journal of the Royal Statistical Society, Series B (Methodological), vol. 58, Issue I, pp. 267-288, 1996.

S. Bucak et al., "Efficient Mult-label Ranking for Multi-class Learning: Application to Object Recognition", IEEE 12th International Conference on Computer Vision (ICCV), pp. 2098-2105, 2009.

C. Desai et al., "Discriminative models for multi-class object layout", ICCV, Oct. 15, 2009.

P. Tseng, "On Accelerated Proximal Gradient Methods for Convex-Concave Optimization", submitted to SIAM Journal of Optimization, pp. 1-20, May 2008.

* cited by examiner

Image labels:
- chair
- dining table
- tv/monitor

FIG. 5

{train, tv/monitor, sheep, boat, dining table }
{boat, dining table, horse, sofa }
{cat, aeroplane, horse, motorbike, train}
...
{sofa, aeroplane, bird, cow, horse, sheep}

GENERIC OBJECT-BASED IMAGE RECOGNITION APPARATUS WITH EXCLUSIVE CLASSIFIER, AND METHOD FOR THE SAME

This application claims the benefit of U.S. Provisional Application No. 61/381,608, filed Sep. 10, 2010.

TECHNICAL FIELD

The present invention relates to image processing and computer vision, and particularly to generic object-based image recognition apparatus and indexing.

BACKGROUND ART

In recent years, image classification/recognition has become an active area of research. In particular, many approaches have been developed to boost performance and robustness of generic object-based image classification by using context information (i.e. concept depending on situations and conditions in the real world, such as human behaviors and object positions. For example, co-occurrence relationships, relative positions, relative scales, and the relationships between a background and a foreground can be the context) (see Non-Patent Literatures 1 through 4).

CITATION LIST

Non-Patent Literature

[Non-Patent Literature 1] Serhat S. Bucak et al, Efficient Multi-label Ranking for Multi-class Learning: Application to Object Recognition, ICCV 2009
[Non-Patent Literature 2] Chaitanya Desai et al, Discriminative Models for Multi-class Object Layout, ICCV2009
[Non-Patent Literature 3] H. Liu and S. Yan, Robust graph mode seeking by graph shift, ICML 2010
[Non-Patent Literature 4] P. Tseng, On accelerated proximal gradient methods for convex-concave optimization, Submitted to SIAM Journal of Optimization 2008

SUMMARY OF INVENTION

Technical Problem

However, the robustness of image recognition has not yet reached the human level, and further improvement is demanded.

The present invention aims to provide a generic object-based image recognition apparatus with enhanced robustness of generic object-based image recognition.

Solution to Problem

To solve the problem described above, the present invention provides an image recognition apparatus for generic object recognition, comprising: an identification unit identifying one or more objects contained in an input image by calculating existence probabilities of candidate objects with reference to feature information, the feature information defining visual features of various objects; and an information accumulating unit accumulating therein exclusive relationship information, the exclusive relationship information defining one or more exclusive object sets each containing different objects predicted not to coexist in a same image, wherein the identification unit adjusts the existence probabilities by using the exclusive relationship information.

Advantageous Effects of Invention

With the stated structure, the image recognition apparatus pertaining to the present invention adjusts the existence probabilities of the candidate objects in order to avoid erroneous results showing that objects predicted not to coexist in a same image have high existence probabilities indicating coexistence of the objects. Thus, the present invention reduces the risk of erroneous existence probabilities, and improves the robustness of generic object recognition.

BRIEF DESCRIPTION OF DRAWINGS

FIG. 5 shows example sets of exclusive labels, pertaining to an embodiment of the present invention.

DESCRIPTION OF EMBODIMENT

1. Embodiment

The following describes an embodiment of the present invention.

An image recognition apparatus pertaining to an embodiment of the present invention recognizes generic objects appearing in an input image, and attaches labels (object labels), which represent the generic objects, to the input image. The image recognition apparatus uses, at image recognition, exclusive context (exclusive relationship information) of objects appearing in the image, and thereby boosts robustness and performance of generic object recognition. As an example of the exclusive context, exclusive label sets are used, which are sets of object labels representing objects that seldom appear in a same image together.

Figure 1:
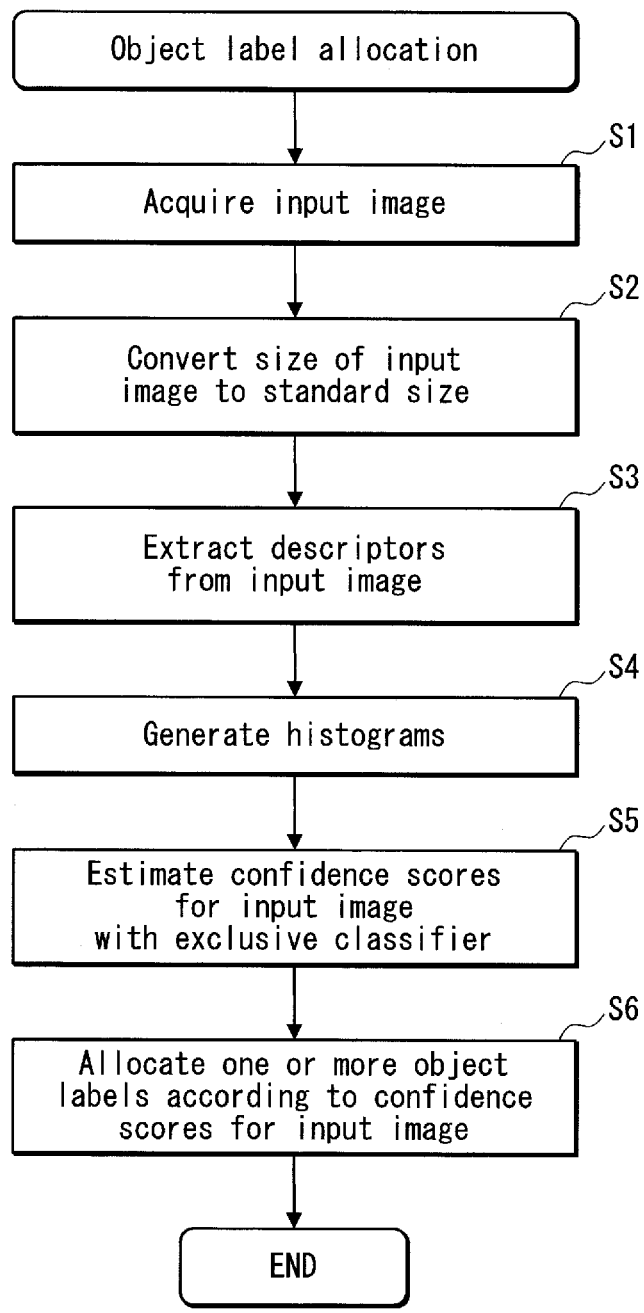
FIG. 1 is a flowchart showing the entire process of attaching object labels to an input image (classification process), pertaining to an embodiment of the present invention.

FIG. 1 is a flowchart showing the entire process of attaching object labels to an input image (classification process).

First, an input image is acquired (S1), and the size thereof is converted to a standard size (S2). Then, descriptors are extracted from the input image (S3). Each descriptor indicates a feature of a local area in the input image. Next, the extracted descriptors are voted to the corresponding image vocabularies for generating histograms to represent the input image (features of the input image) (S4). Here, an image vocabulary consists of descriptors that are representatives of the descriptors that have similar features. Image vocabularies are generated in a learning process, which is a process performed before the classification process and of learning features of collected images. Next, the features of the input image generated in S4 are compared with the results of learning through the learning process, by using the exclusive classifier. Also, confidence scores for the input image (existence probabilities of candidate objects for the input image) are calculated by using the exclusive label sets (S5). Then, based on the confidence scores for the input image, one or more object labels are assigned (S6).

The following describes the image recognition apparatus in details.

Figure 2:
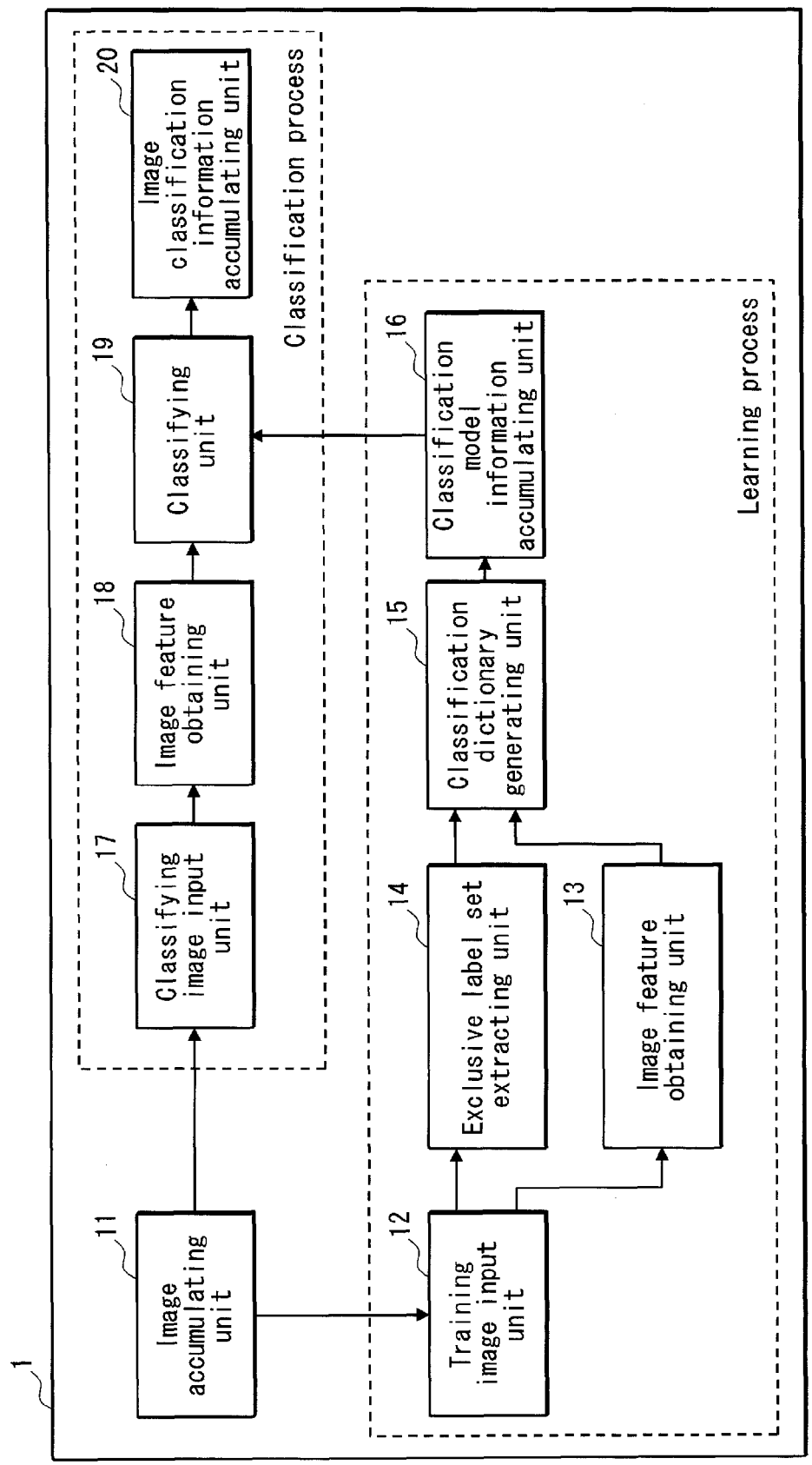
FIG. 2 is a block diagram showing the structure of a generic object-based image recognition apparatus with an exclusive classifier, pertaining to an embodiment of the present invention.

FIG. 2 is a block diagram showing the structure of a generic object-based image recognition apparatus 1 with an exclusive classifier, pertaining to an embodiment of the present invention.

The image recognition apparatus 1 includes an image accumulating unit 11, a training image input unit 12, an image feature obtaining unit 13, an exclusive label set extracting unit 14, a classification dictionary generating unit 15, a classification model information accumulating unit 16, a classifying image input unit 17, an image feature obtaining unit 18, a classifying unit 19, and an image classification information accumulating unit 20. The learning process is performed by the training image input unit 12, the image feature obtaining unit 13, the exclusive label set extracting unit 14, the classification dictionary generating unit 15 and the classification model information accumulating unit 16. The classification process for actually classifying the objects appearing in the input image based on the results of learning is performed by classifying image input unit 17, the image feature obtaining unit 18, the classifying unit 19 and the image classification information accumulating unit 20, which collectively serve as an identification unit.

The image accumulating unit 11 is an accumulation device for accumulating collected images as training images used in the learning process, as well as input images to be actually subject to the object recognition.

In this embodiment, labeled images contained in training data sets of the PASCAL Visual Object Classes Challenge 2010 (VOC2010) are used as collected images.

The training data sets of the VOC2010 are composed of a plurality of (e.g. approximately ten thousands of) images each including "objects" belonging to any of twenty classes (Person, Animal, Vehicle, Indoor). Each of the collected images is attached with labels indicating the classes of the objects appearing in the image. The labels corresponding to the twenty classes are, namely, "cat", "aeroplane", "bicycle", "bird", "boat", "bottle", "bus", "car", "chair", "dining table", "dog", "horse", "motorbike", "person", "potted plant", "sheep", "train", "tv/monitor", "cow", and "sofa", for example. Of course, the labels are not limited to these. In addition the number of the classes is not limited to twenty. One collected image may contain a plurality of objects. Also, these objects may belong to a same class, or to different classes.

Figure 4:
FIG. 4 shows an example of collected images to which labels have been attached manually, pertaining to an embodiment of the present invention.

FIG. 4 shows an example of collected images. In this example, labels "chair", "dining table", and "tv/monitor" are attached to the image.

Next, description is provided of the training image input unit 12, the image feature obtaining unit 13, the exclusive label set extracting unit 14, the classification dictionary generating unit 15 and the classification model information accumulating unit 16, which pertain to operations for the learning process.

The training image input unit 12 sequentially reads collected images from the image accumulating unit 11, and outputs the images to the exclusive label set extracting unit 14 and the image feature obtaining unit 13.

The image feature obtaining unit 13 generates image vocabularies by obtaining features from an input image.

Figure 6:
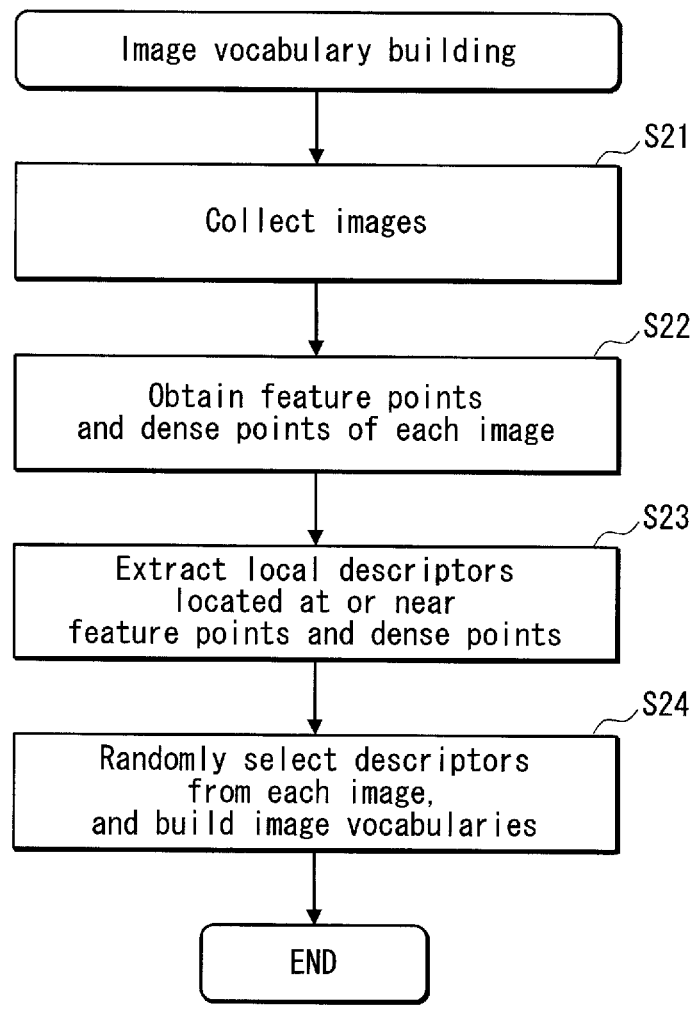
FIG. 6 is a flowchart showing a process of image vocabulary building, pertaining to an embodiment of the present invention.

FIG. 6 is a flowchart showing a process of image vocabulary building performed by the image feature obtaining unit 13.

Figure 7:
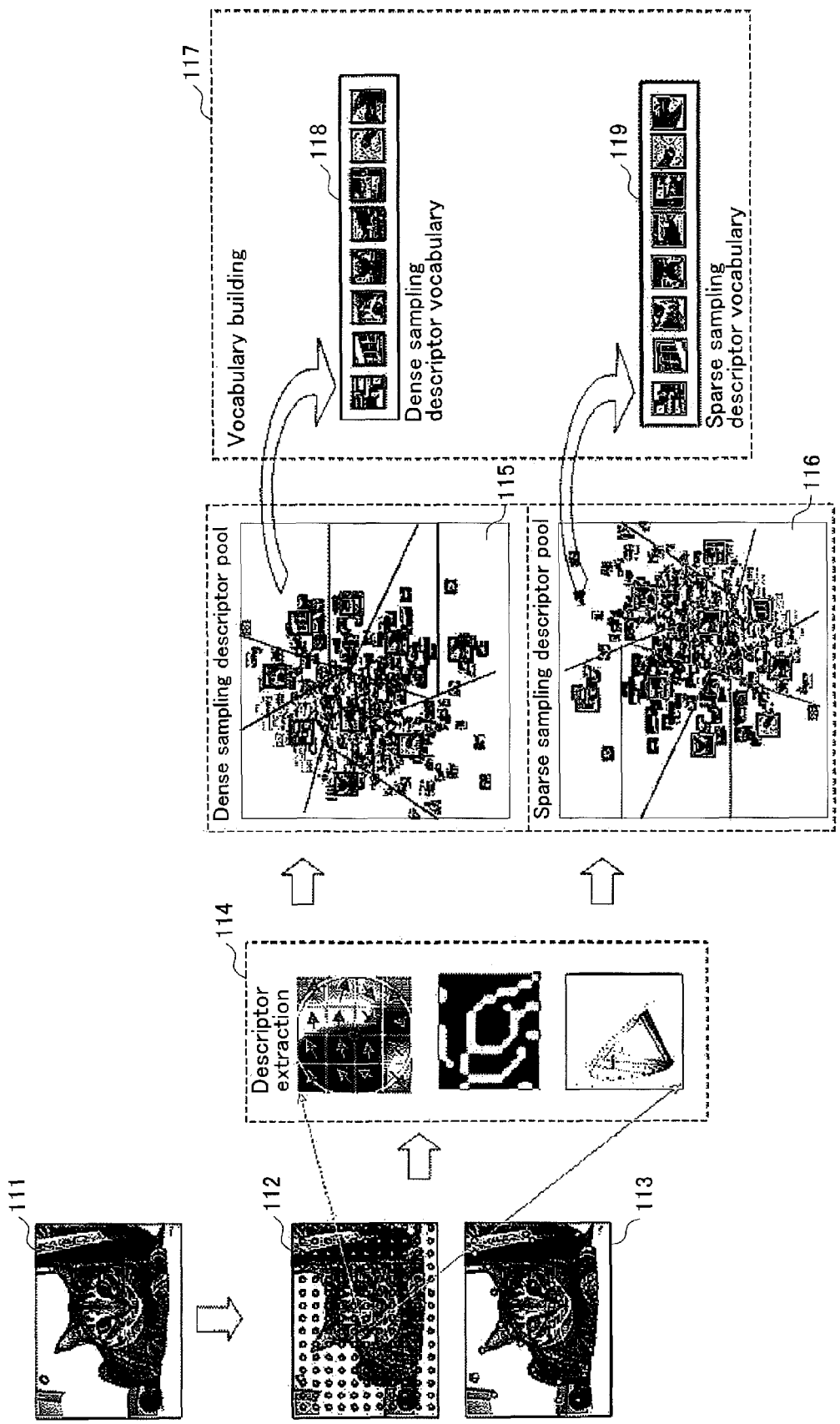
FIG. 7 is a diagram for explaining a basic concept of image vocabulary building, pertaining to an embodiment of the present invention.

FIG. 7 is a diagram for explaining a basic concept of image vocabulary building using input images.

The image feature obtaining unit 13 first acquires a collected image (e.g. the collected image 111 shown in FIG. 7) (S21), and obtains: grid points located at constant intervals on the image (e.g., the grid points shown on the image 112. Such points are hereinafter referred to as "dense points"); and characteristic sparse points (e.g., the points shown on the image 113. Such points are hereinafter referred to as "sparse points") (S22). The sparse points are characteristic points exhibiting sharp changes in luminance or shape. For example, a portion of an eye of the cat and a point indicating the tip of an ear can be sparse points. In the following, dense points and sparse points may be collectively referred to as feature points. Next, the image feature obtaining unit 13 extracts descriptors located at or near the feature points (S23). Extraction of descriptors are performed by using a known SIFT (Scale Invariant Feature Transform) algorithm, for example. SIFT is a technology of determining a representative luminance gradient direction at a feature point, generating a luminance gradient histogram in another direction with reference to the representative direction, and representing a feature by using a multidimensional vector. SIFT is thereby characterized in its robustness against rotation, change in scale, and change in illumination.

The images 114 in FIG. 7 schematically show the extracted descriptors. The descriptors above are local descriptors representing features of local areas within a single image. However, global descriptors representing features of the entire image (e.g. color phase distribution in the entire image) may be used as descriptors. Also, both local descriptors and global descriptor may be used in combination.

Next, the image feature obtaining unit 13 stores all the extracted descriptors into a descriptor pool. In FIG. 7, the image 115 schematically shows the descriptor pool for dense points, and the image 116 schematically shows the descriptor pool for sparse points.

Then, the image feature obtaining unit 13 randomly selects descriptors from each descriptor pool, and builds an image vocabulary. Here, an image vocabulary consists of, as described above, descriptors that are representatives of the descriptors that have similar features. As image vocabularies, vector-quantized descriptors may be used.

The images 117 schematically show image vocabularies generated for the "cat", and include an image vocabulary (e.g. image 118) including descriptors selected from the dense point descriptor pool and an image vocabulary (e.g. image 119) including descriptors selected from the sparse point descriptor pool.

Next, the image feature obtaining unit 13 generates histograms relating to image vocabularies, for each of the collected images.

Figure 8:
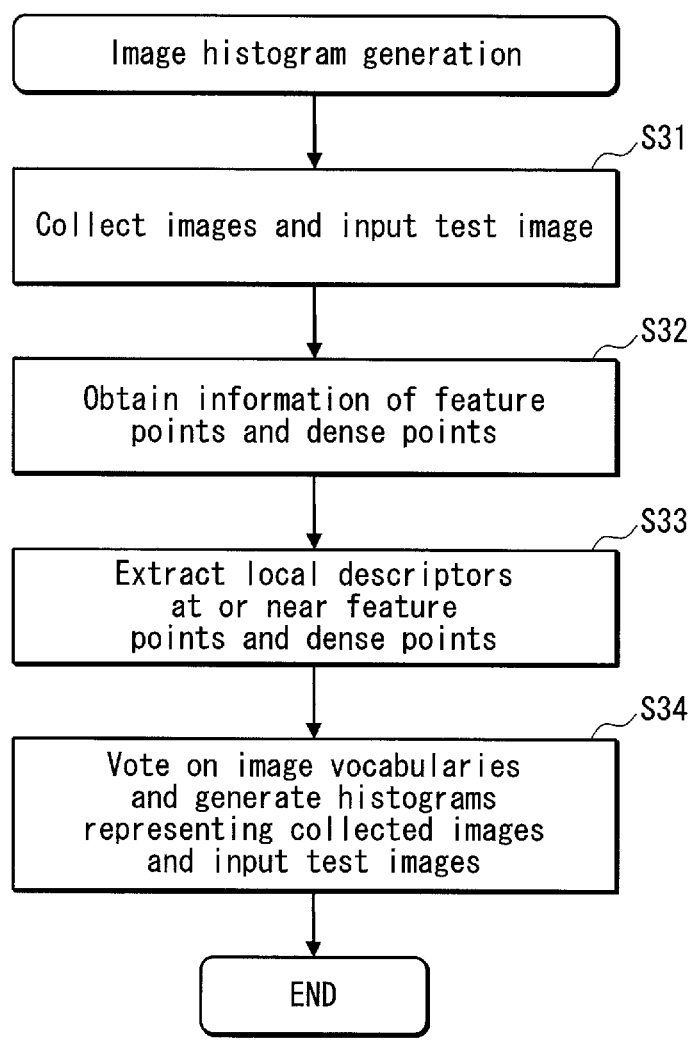
FIG. 8 is a flowchart showing an exemplary process of generating image histograms, pertaining to an embodiment of the present invention.

FIG. 8 is a flowchart showing a process of generating image histograms.

The image feature obtaining unit 13 first acquires a collected image (S31), then obtains feature points from the collected image (S32), and extracts descriptors located at or near the feature points (S33). The processing from S31 to S33 is the same as the processing from S21 to S23 described above.

Next, the image vocabularies closest to each descriptor of the collected image are voted, and the image feature obtaining unit 13 obtains histograms representing the collected images (S34). In the following description, histograms representing an image may be referred to as the features of the image.

Figure 9:
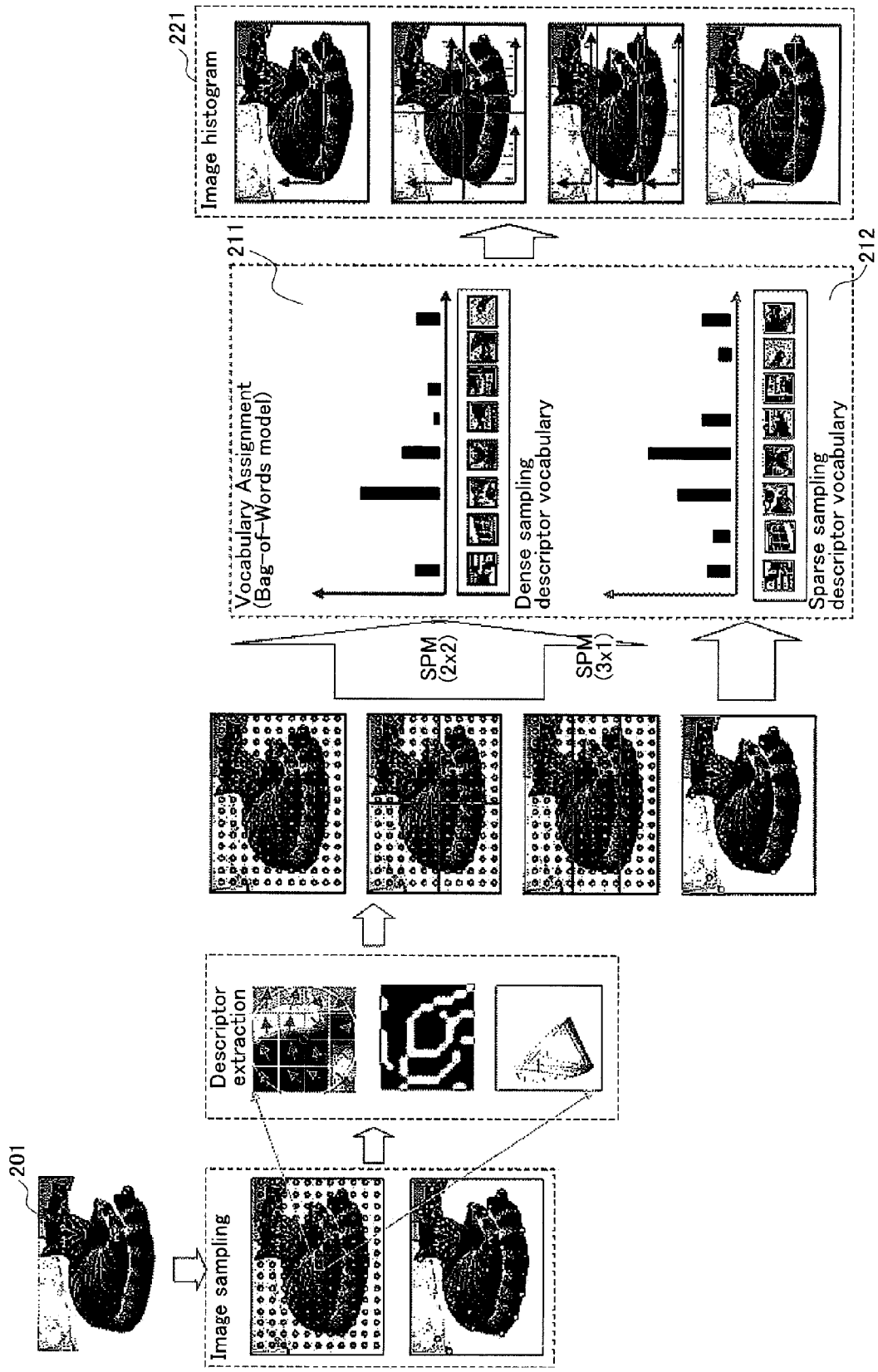
FIG. 9 is a diagram for explaining features of collected images, pertaining to an embodiment of the present invention.

FIG. 9 is a diagram for explaining the features of the collected images.

The features 211 shown in FIG. 9 schematically represent features of a collected image, which have been obtained based on the results of the voting on the image vocabularies build in the manner described above with reference to FIG. 7. Here, spatial information of the image may be added to the features of the image. For example, the image may be equally divided into three or four portions in terms of space, and a histogram may be generated for each of the portions (e.g. the images 221 in FIG. 9).

Also, the plurality of image histograms representing the collected images and the input image may be represented according to the bag-of-words model.

The exclusive label set extracting unit 14 extracts sets of exclusive labels.

FIG. 5 shows example sets of exclusive labels.

As described above, "train", "tv/monitor", and so on are labels, and the set of {train, tv/monitor, sheep, boat, dining table} is an exclusive label set. An exclusive label set shows the combination of objects that can not appear in a same image. For example, the exclusive label set {train, tv/monitor, sheep, boat, dining table} represents that when "train" appears in an image, none of "tv/monitor", "sheep", "boat", and "dining table" appears in the image.

Such exclusive label sets may be determined manually (according to an empirical rule), or be extracted from collected images or the likes by a statistical approach. In the present embodiment, it is assumed that the exclusive label set extracting unit 14 holds known exclusive label sets that have been given in advance. An example case of extracting exclusive label sets manually will be described later as a modification. The accuracy in classifying objects improves as the number of exclusive label sets increases. Hence, exclusive label sets assumed to be effective for the classification may be created manually, or exclusive label sets focusing only on a particular category to be classified may be created.

The classification dictionary generating unit 15 accumulates the features of the collected images and the exclusive label sets into the classification model information accumulating unit 16, as a classification dictionary.

Next, description is provided of the classifying image input unit 17, the image feature obtaining unit 18, the classifying unit 19, and the image classification information accumulating unit 20, which pertain to the classification process.

The classifying image input unit 17 reads an image (input image) to be attached with object labels from the image accumulating unit 11, and provides the image to the image feature obtaining unit 18.

The image feature obtaining unit 18 obtains features representing the input image. The process of obtaining features is the same as the process described as for the image feature obtaining unit 13 with reference to FIG. 8 and FIG. 9. Hence, the explanation thereof is omitted.

The classifying unit 19 includes an exclusive classifier, and performs generic object-based image recognition by using the exclusive classifier. The classifying unit 19 calculates a confidence score for each object included in the input image, based on the features of the input image obtained by the image feature obtaining unit 18 and the features of each of the collected images obtained in the learning process. Based on the confidence scores, the classifying unit 19 identifies the types of the objects existing in the input image. The exclusive classifier in the present embodiment is of a type that uses LASSO (Least Absolute Shrinkage and Selection Operator) prediction with exclusive context. Conventionally, as in the LASSO framework, the objective to optimize consists of two terms. One is reconstruction error, and the other is regularization on reconstruction coefficients w. Reconstruction error is used to measure the difference between the features of the input image and features obtained by linearly reconstructing the features of all the collected images by using the reconstruction coefficients (i.e. to measure the validity of the features obtained by the reconstruction). Higher reconstruction error means lower validity.

In contrast, the present embedment defines a new type of regularization term with corresponding reconstruction coefficients using exclusive label sets. The label exclusive linear representation model using the new regularization term for an input image having a feature $y \in R^m$ is defined as follows:

$$(\hat{w}, \hat{u}) = \operatorname*{argmin}_{w,u} \frac{1}{2} \|y - Xw\|_2^2 + \frac{\lambda}{2} \sum_{G_i \in G} \|u_{G_i}\|_1^2 \qquad (1)$$

$$\text{s.t.} \quad u = Lw$$

In this new formula, $X \in R^{m \times n}$ (i.e. $X=[x_1, x_2, \ldots, x_n]$, $x_i \in R^m$) represents the features of each of the collected image. The features of each of the collected images have been obtained by the image feature obtaining unit 13 as described above. n represents the number of the collected images. m represents the dimension number of descriptors and matches the number of descriptors included in an image vocabulary. $w \in R^n$ represents a linear reconstruction coefficient for all the object classes, evaluated for the input image. $u \in R^p$ represents a confidence score evaluated for the input image. G represents exclusive label sets obtained from the collected image data set by a statistical approach. The number of object labels defined in each exclusive label set $G_i$ is at most one in a single image. In particular, $u_{Gi}$ represents a sequence of u attached with an index $G_i$, and is a penalty value to be set when an exclusive label set is detected in the calculation process of the formula (1). L1 norm is applied to $u_{Gi}$ to achieve sparsity in $G_i$. Here, in each $G_i$, at most one label is selected necessarily. L2 norm for $u_{Gi}$ is used to combine all the possible exclusive sets that include a same object. In other words, these exclusive sets may be overlapped with respect to the same object. Specifically, the exclusive label set $G_i$ represents vectors each having p elements. Each element corresponds to a different object ("aeroplane", "bicycle", "bird", "boat", "bottle", "bus", "car", "cat", "chair", "cow", "dining table", "dog", "horse", "motorbike", "person", "potted plant", "sheep", "sofa", "train", "tv/monitor"), and a value 0 is set to the objects that have an exclusive relationship, and a value 1 is set to the rest of the objects. For example, in FIG. 5, the vector indicating the exclusive label set containing "train, tv/monitor, sheep, boat, dining table" is [0 0 0 1 0 0 0 0 0 0 1 0 0 0 0 0 1 0 1 1].

The following further explains w and u described above, with reference to FIG. 10.

Figure 10:
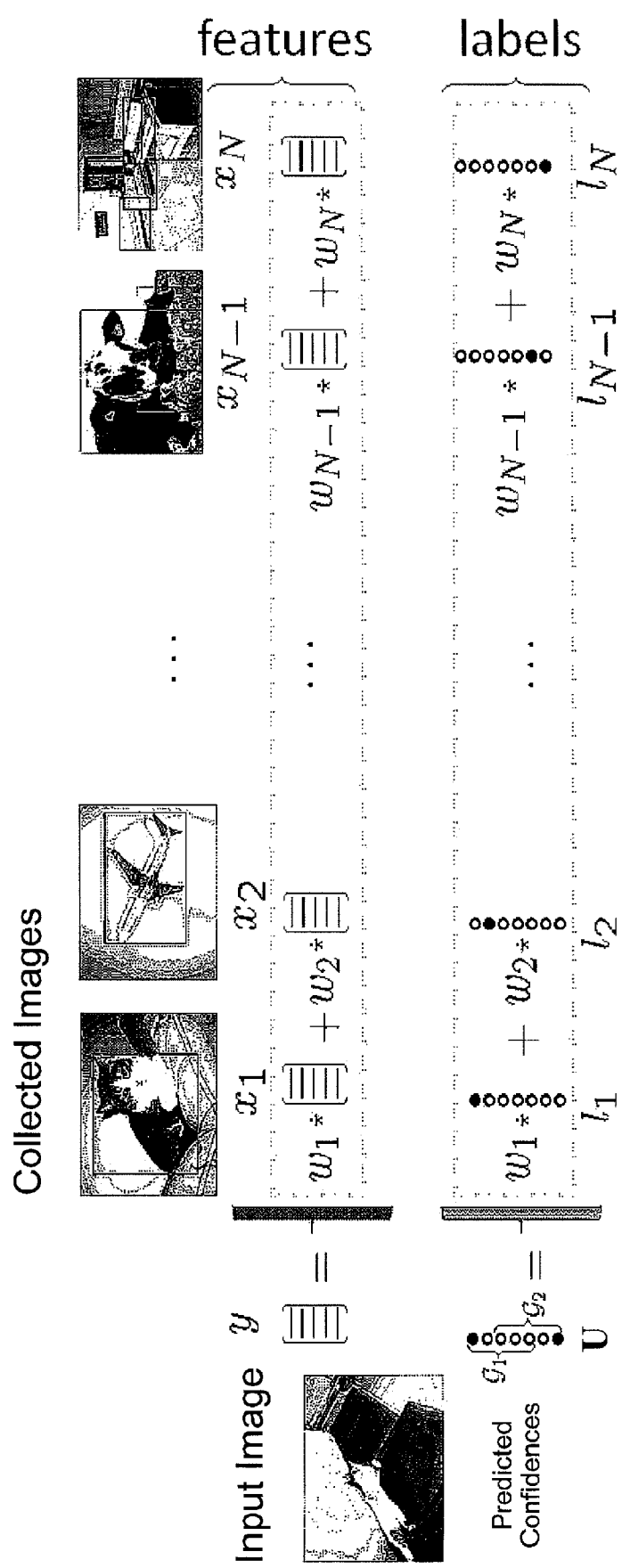
FIG. 10 shows a concept of generic object-based image recognition with the use of an exclusive classifier.

FIG. 10 shows a concept of generic object-based image recognition with the use of an exclusive classifier.

The expression $w_1*x_1+w_2*x_2 \ldots w_n*x_n(=Xw)$ shown in FIG. 10 schematically represents that the feature y of the input image is reconstructed from the features $x_1, x_2, \ldots, x_n$ of all the collected images. w, which is generated through the reconstruction, is used for calculating the confidence score.

The confidence score $u \in R^p$ is calculated by the formula $u=w_1*l_1+w_2*l_2 w_n*l_n$ shown in FIG. 10. p represents the total number of object classes included in the collected image set. The label $L \in R^{p \times n}$ (i.e. $L=[l_1,l_2,\ldots l_n]$) represents the labels of the objects included in the images (image 1, image 2, . . . image n) corresponding to the labels. $l_1, l_2, \ldots, l_n$ represent vectors (label vectors) each having p elements. Each element represents whether the corresponding object ("aeroplane", "bicycle", "bird", "boat", "bottle", "bus", "car", "cat", "chair", "cow", "dining table", "dog", "horse", "motorbike", "person", "potted plant", sheep", "sofa", "train", "tv/monitor") exists or not (the value 1 is set when the object exists, and the value 0 is set when the object does not exist). For example, the label vector of the image shown in FIG. 4, which contains "chair", "dining table" and "tv/monitor", is [0 0 0 0 0 0 0 1 0 1 0 0 0 0 0 0 0 0 0 1]. In FIG. 10, each element of vectors $l_1$, $l_2, \ldots, l_n$ is represented as a filled circle when the value is "1", and as an open circle when the value is "0". The confidence score of "cat", for example, is obtained by calculating the sum of w of each label whose element corresponding to "cat" is set to be 1. This concludes the supplemental explanation of FIG. 10, and the following resumes the explanation of the formula (1) above.

The first term in the formula (1) represents reconstruction error as described above. Specifically, the first term represents the difference between the feature y of the input image and the feature Xw linearly reconstructed from all the collected images. Lower reconstruction error means higher validity of the feature linearly reconstructed from all the collected images, i.e. higher validity of w.

The second term in the formula (1) is a penalty value which will be large when two or more objects included in an exclusive label set appear in the input image at the same time. Note that λ represents a regularization rate, and is an arbitrary constant showing how much the second term should be taken in consideration.

The reconstruction coefficient $w \in R^n$ is optimal when it minimizes the formula (1) as a whole, and w can be derived by solving the "optimization problem" of the formula (1). The optimization problem can be solved by a known algorithm (e.g. the steepest descent method, the linear search method). The actual processing is as follows: an initial point is given to w; the value of the entire formula is calculated and evaluated; then, determination of a provisional value of w using the steepest descent method, the linear search method, or the like, and the calculation and evaluation of the value of the entire formula are performed repeatedly. Eventually, the optimal w that minimizes the value of the entire formula (1) will be obtained.

In the iteration process, a provisional confidence score is obtained by using the provisional w when the provisional w is determined. When it is determined based on the provisional confidence score that there are two or more objects and the two or more objects belong to the exclusive label set $G_i$, a predetermined penalty value (e.g. "1") is set to $u_{G_i}$ of the second term in the formula (1). As a result, the value of the second term in the formula (1) increases, and accordingly, the value of the entire formula (1) increases. Hence, w to be determined provisionally next time will be adjusted so that the confidence score of each of the two or more objects included in the exclusive label set will be decreased.

The confidence score obtained by solving the optimization problem and using the finally determined w reflects whether or not the objects appearing in the input image are the same as the combination of objects represented by the exclusive label set. Hence, the validity of the confidence score is higher than conventional technology. Whether or not the objects appearing in the input image are the same as the combination of objects represented by the exclusive label set is also taken in consideration when provisionally determining the value w the validity of the provisional w is also higher than conventional technology. This shortens the time required for obtaining the final valid value of w. In other words, the computing efficiency is higher than conventional technolgy.

Note that the classification performance may be improved by using common classifiers such as the GMM (Gaussian mixture model) and the SVM (Support Vector Machine) in combination, and using the final confidence score obtained by combining the confidence scores calculated by the classifiers.

2. MODIFICATIONS

Although the present invention has been described based on Embodiment above, various modifications may be adopted within the scope of the present invention.

(A) To solve the optimization problem with respect to the formula (1) above, the method of Lagrange multipliers may be applied. Hence, a relaxed unconstraint optimization problem of the formula (2) may be solved instated of the constrained optimization problem of the formula (1).

$$(\hat{w}, \hat{u}) = \underset{w,u}{\mathrm{argmin}} \frac{1}{2}\|y - Xw\|_2^2 + \mu\|u - Lw\|_2^2 + \frac{\lambda}{2}\sum_{G_i \in G}\|u_{G_i}\|_1^2 \quad (2)$$

Here, μ denotes a Lagrange multiplier, where μ≥0. The formula (2) can be solved by a common solver for the quadratic programming problem (QP). The APG (Accelerated Proximal Gradient) method described in Non-Patent Literature 4, which is one type of QP solvers, is effective for solving the formula (2), and it can be implemented easily.

(B) Although it is assumed in the above that the exclusive label set extracting unit 14 holds exclusive label sets that have been given in advance, the exclusive label set extracting unit 14 may generate exclusive label sets from the collected images by using graph shift (Non-Patent Literature 3) or the like. The graph shift method originally is a method for detecting the degree of co-occurrence. However, it is possible to generate exclusive label sets by obtaining a graph in which objects do not co-occur in the image.

To effectively and efficiently obtain the exclusive label sets, the graph shift is used as a typical method to learn a set of exclusive labels as dense subgraphs on a properly defined exclusive weighted label graph from collected images.

Figure 3:
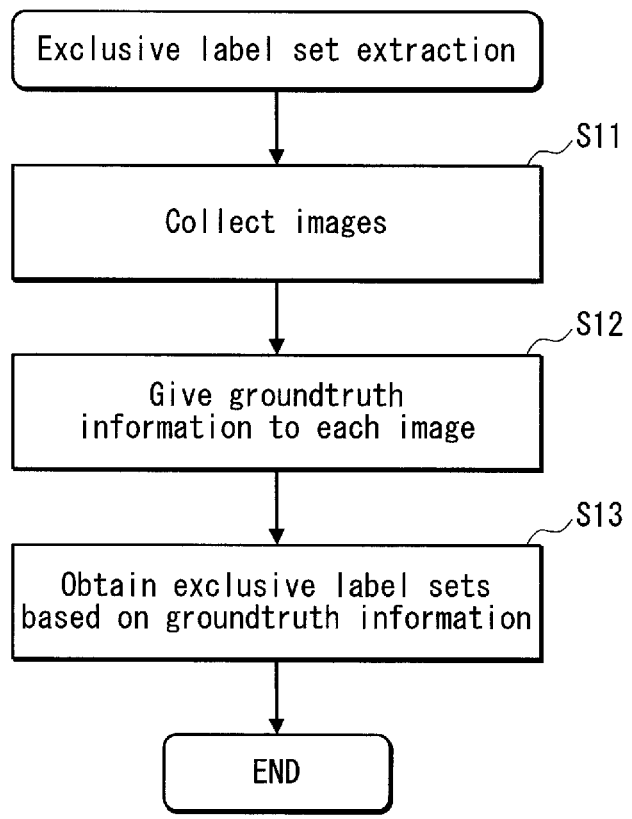
FIG. 3 shows a process of extracting exclusive label sets, pertaining to an embodiment of the present invention.

FIG. 3 shows a process of extracting exclusive label sets.

In this process, first, images are collected (S11), then, information associated with answers (groundtruth information) is given to the collected images (S12), and exclusive label sets are obtained based on the groundtruth information (S13). The following describes this process in details.

First, an exclusive weighted label graph G ^=<V,E> can be constructed using groundtruth information from the collected images. Here, the cardinality of the node set V is p (denotes the size of object labels in the collected images). The edge set $E \subset V \times V$ describes the exclusive graph topology. Then G ^ can be equivalently represented by an exclusive weight matrix $W=\{w_{ij}\} \in R^{p \times p}$. For the sake of computation, the exclusive weight matrix could be defined as follows: $w_{ij}=1$ if $v_i$ and $v_j$ do not simultaneously appear in any of the collected images, and $w_{ij}=0$ otherwise. There is no self-loops in the procedure of constructing exclusive graph.

In order to find the exclusive dense subgraphs, the following standard quadratic optimization problem (QP) is described:

$$\hat{x} = \underset{x}{\operatorname{argmax}}\, x^T W x \qquad (3)$$

$$\text{s.t.} \quad x \in \Delta^p \equiv \{x \in R^p : x \geq 0, \|x\|_1 = 1\}.$$

Where x indicates one dense subgraph in the exclusive weighted label graph G ^, i.e. one exclusive image set. Here, according to the principle of exclusive label sets (i.e. the number of object labels defined in each exclusive label set is at most one in a single image), x is constrained to satisfy $x \geq 0$, $\|x\|_1=1$. $\|x\|_1$ represents L1 norm of x, to which a value 1 is set to indicate that only one label appears in a single image.

According to the graph shift method described above, it is possible not only to statistically extract exclusive label sets not observed, but also to extract the combination of labels not co-occurring in a graph, since the weights of the exclusive label sets are taken in consideration. The combination of labels not co-occurring can be obtained as dense subgraphs. Hence, exclusive label sets with weights as priorities can be extracted.

(C) The following explains an image recognition apparatus as an embodiment of the present invention, and the advantageous effects that are achieved by the same.

One aspect of the present invention is an image recognition apparatus, comprising: an identification unit identifying one or more objects contained in an input image by calculating existence probabilities of candidate objects with reference to feature information, the feature information defining visual features of various objects; and an information accumulating unit accumulating therein exclusive relationship information, the exclusive relationship information defining one or more exclusive object sets each containing different objects predicted not to coexist in a same image, wherein the identification unit adjusts the existence probabilities by using the exclusive relationship information.

The identification unit may adjust the existence probabilities by lowering existence probabilities of candidate objects that match any of the exclusive object sets defined by the exclusive relationship information.

The identification unit may calculate the existence probabilities by using LASSO (Least Absolute Shrinkage and Selection Operator) prediction, and lower the existence probabilities by setting a penalty value to a LASSO regularization parameter.

The exclusive relationship information may define a plurality of exclusive object sets, and the penalty value may be set greater when a greater number of candidate object combinations match any of the exclusive object sets defined by the exclusive relationship information, each candidate object combination consisting of a predetermined number of candidate objects each having an existence probability no lower than a predetermined value.

The identification unit may adjust the existence probabilities by using the following formula:

$$(\hat{w}, \hat{u}) = \underset{w,u}{\operatorname{argmin}} \frac{1}{2} \|y - Xw\|_2^2 + \frac{\lambda}{2} \sum_{G_i \in G} \|u_{G_i}\|_1^2,$$

where $y \in R^m$ denotes a feature of the input image, $X \in R^{m \times n}$ denotes features of collected images as training images, n denotes a number of the collected images, m denotes a dimension number of descriptors, $w \in R^n$ denotes a linear reconstruction coefficient for all object classes evaluated for the input image, $G_i$ denotes the exclusive label sets, and $u_{G_i}$ denotes the penalty value.

The exclusive relationship information may be obtained by a statistical method from images as training images each containing identified objects.

With the stated structure, the image recognition apparatus adjusts the existence probabilities of the candidate objects in order to avoid erroneous results showing that objects predicted not to coexist in a same image have high existence probabilities indicating coexistence of the objects. Thus, the present invention reduces the risk of erroneous existence probabilities, and improves the robustness of generic object recognition.

The exclusive relationship may be obtained by a graph shift method from images as training images each containing identified objects.

With the stated structure, object labels not co-occurring can be obtained as dense subgraphs. Hence, exclusive relationship information with weights as priorities can be extracted.

Another aspect of the present invention is an image recognition method for generic object recognition, comprising: an information accumulating step of accumulating exclusive relationship information, the exclusive relationship information defining one or more exclusive object sets each containing different objects predicted not to coexist in a same image; and an identification step of identifying one or more objects contained in an input image by calculating existence probabilities of candidate objects with reference to feature information, the feature information defining visual features of various objects, wherein through the calculation performed in the identification step, the existence probabilities are adjusted by using the exclusive relationship information.

Another aspect of the present invention is a computer program used by an image recognition apparatus for generic object recognition, causing a computer to perform: an information accumulating step of accumulating exclusive relationship information, the exclusive relationship information defining one or more exclusive object sets each containing different objects predicted not to coexist in a same image; and an identification step of identifying one or more objects contained in an input image by calculating existence probabilities of candidate objects with reference to feature information, the feature information defining visual features of various objects, wherein through the calculation performed in the identification step, the existence probabilities are adjusted by using the exclusive relationship information.

Another aspect of the present invention is an integrated circuit used in an image recognition apparatus for generic object recognition, comprising: an identification unit identifying one or more objects contained in an input image by calculating existence probabilities of candidate objects with reference to feature information, the feature information defining visual features of various objects; and an information accumulating unit accumulating therein exclusive relationship information, the exclusive relationship information defining one or more exclusive object sets each containing different objects predicted not to coexist in a same image, wherein the identification unit adjusts the existence probabilities by using the exclusive relationship information.

With the stated structure, the image recognition apparatus adjusts the existence probabilities of the candidate objects in order to avoid erroneous results showing that objects predicted not to coexist in a same image have high existence probabilities indicating coexistence of the objects. Thus, the present invention reduces the risk of erroneous existence probabilities, and improves the robustness of generic object recognition.

(D) Part or all of the components constituting the apparatuses described above may be realized by distributing a control program recorded on a recording medium or distributing a control program via any of various types of communication channels, the control program being composed of program codes written in a machine language or a high-level language for operating the processor of the image recognition apparatus or various types of circuits connected to the processor. Such recording media include: an IC card, a hard disk, an optical disc, a flexible disk, a ROM, a flash memory, etc. The distributed control program is used after being stored in a memory or the like that can be read by the processor, and the functions described in the above can be realized by the processor executing the control program. The processor may directly execute the control program, or execute it after compiling. Alternatively, an interpreter may execute the control program.

(E) Part or all of the components of the apparatuses described above may be structured from circuits for realizing the functions of the components, or from a program for realizing the functions of the components and the processor executing the program, or from a single system LSI (Large Scale Integration). A system LSI is a super multifunctional LSI manufactured by integrating a plurality of structural components onto a single chip. Specifically, it is a computer system including a microprocessor, a ROM, a RAM, and the like. A computer program is stored in the RAM. The system LSI achieves its functions as the microprocessor operates in accordance with the computer program. Each of the units may be realized as a single chip. Alternatively, part or all of the units may be included in a single chip.

Although LSI is mentioned above, the term IC, system LSI, super LSI, or ultra LSI may be used according to the degree of integration.

Further, the integration method is not limited to LSI. The integrated circuit may also be realized as a private circuit or a general-purpose processor. After LSI manufacture, a FPGA (Field Programmable Gate Array), which is programmable, or a reconfigurable processor, in which the setting of, and the connections between the circuit cells within the LSI are reconfigurable, may also be used.

Further still, advances and discoveries in semiconductor technology may lead to a new technology replacing LSI. The present invention may, of course, be applied to such future functional block technology. The application of biotechnology and the like is also plausible.

(F) Part or all of the constituent elements of the apparatuses above may be structured as a removable IC card or stand-alone module. The IC card or the module is a computer system including a microprocessor, a ROM, a RAM, and the like. The IC card and the module may include the above super multifunctional LSI. The IC card and the module achieve their functions as the microprocessor operates in accordance with the computer program. This IC card or module may be tamper resistant.

(G) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

The present invention may be the computer programs or digital signals which are transmitted via an electronic communications circuit, a wireless or fixed-line communications circuit, a network such as the Internet, a data broadcast, etc.

The present invention may be carried out by another independent computer system by transferring the programs or the digital signals which have been recorded on the recording media, or by transferring the programs or the digital signals via the network, etc.

(H) The present invention may be any combination of the above embodiments and modifications.

INDUSTRIAL APPLICABILITY

The present invention is suitable to be built in a data management apparatus for managing pieces of picture data by labeling each piece, and used in storing a large amount of picture data or the like in which generic objects are captured, for example.

REFERENCE SIGNS LIST

1. Image recognition apparatus
11. Image accumulating unit
12. Training image input unit
13. Image feature obtaining unit
14. Exclusive label set extracting unit
15. Classification dictionary generating unit
16. Classification model information accumulating unit
17. Classifying image input unit
18. Image feature obtaining unit
19. Classifying unit
20. Image classification information accumulating unit

The invention claimed is:
1. An image recognition apparatus for generic object recognition, comprising:
an identification unit identifying one or more objects contained in an input image by calculating existence probabilities of candidate objects by using LASSO (Least Absolute Shrinkage and Selection Operator) prediction with reference to feature information, the feature information defining visual features of various objects; and
an information accumulating unit accumulating therein exclusive relationship information, the exclusive relationship information defining one or more exclusive object sets each containing different objects predicted not to coexist in a same image, wherein
the identification unit adjusts the existence probabilities by using the exclusive relationship information, and
the adjustment is performed by setting a penalty value to a LASSO regularization parameter and thereby lowering existence probabilities of candidate objects that match any of the exclusive object sets defined by the exclusive relationship information.

2. The image recognition apparatus of claim 1, wherein
the exclusive relationship information defines a plurality of exclusive object sets, and
the penalty value is set greater when a greater number of candidate object combinations match any of the exclusive object sets defined by the exclusive relationship information, each candidate object combination consisting of a predetermined number of candidate objects each having an existence probability no lower than a predetermined value.

3. The image recognition apparatus of claim 1, wherein the identification unit adjusts the existence probabilities by using the following formula:

$$(\hat{w}, \hat{u}) = \operatorname*{argmin}_{w,u} \frac{1}{2}\|y - Xw\|_2^2 + \frac{\lambda}{2}\sum_{G_i \in G}\|u_{G_i}\|_1^2,$$

where $y \in R^m$ denotes a feature of the input image, $X \in R^{m \times n}$ denotes features of collected images as training images, n denotes a number of the collected images, m denotes a dimension number of descriptors, $w \in R^n$ denotes a linear reconstruction coefficient for all object classes evaluated for the input image, $G_i$ denotes the exclusive label sets, and $u_{G_i}$ denotes the penalty value.

4. The image recognition apparatus of claim 1, wherein the exclusive relationship information is obtained by a statistical method from images as training images each containing identified objects.

5. The image recognition apparatus of claim 1, wherein the exclusive relationship is obtained by a graph shift method from images as training images each containing identified objects.

6. An image recognition method for generic object recognition, comprising:
an information accumulating step of accumulating exclusive relationship information, the exclusive relationship information defining one or more exclusive object sets each containing different objects predicted not to coexist in a same image; and
an identification step of identifying one or more objects contained in an input image by calculating existence probabilities of candidate objects by using LASSO (Least Absolute Shrinkage and Selection Operator) prediction with reference to feature information, the feature information defining visual features of various objects, wherein
through the calculation performed in the identification step, the existence probabilities are adjusted by using the exclusive relationship information, and
the adjustment is performed by setting a penalty value to a LASSO regularization parameter and thereby lowering existence probabilities of candidate objects that match any of the exclusive object sets defined by the exclusive relationship information.

7. A non-transitory computer-readable medium having a computer program stored thereon, the computer program for use with an image recognition apparatus for generic object recognition, and causing a computer to perform:
an information accumulating step of accumulating exclusive relationship information, the exclusive relationship information defining one or more exclusive object sets each containing different objects predicted not to coexist in a same image; and
an identification step of identifying one or more objects contained in an input image by calculating existence probabilities of candidate objects by using LASSO (Least Absolute Shrinkage and Selection Operator) prediction with reference to feature information, the feature information defining visual features of various objects, wherein
through the calculation performed in the identification step, the existence probabilities are adjusted by using the exclusive relationship information, and
the adjustment is performed by setting a penalty value to a LASSO regularization parameter and thereby lowering existence probabilities of candidate objects that match any of the exclusive object sets defined by the exclusive relationship information.

8. An integrated circuit used in an image recognition apparatus for generic object recognition, comprising:
an identification unit identifying one or more objects contained in an input image by calculating existence probabilities of candidate objects by using LASSO (Least Absolute Shrinkage and Selection Operator) prediction with reference to feature information, the feature information defining visual features of various objects; and
an information accumulating unit accumulating therein exclusive relationship information, the exclusive relationship information defining one or more exclusive object sets each containing different objects predicted not to coexist in a same image, wherein
the identification unit adjusts the existence probabilities by using the exclusive relationship information, and
the adjustment is performed by setting a penalty value to a LASSO regularization parameter and thereby lowering existence probabilities of candidate objects that match any of the exclusive object sets defined by the exclusive relationship information.

\* \* \* \* \*